(12) United States Patent
Chabukswar et al.

(10) Patent No.: US 11,561,536 B2
(45) Date of Patent: Jan. 24, 2023

(54) BUILDING HEALTH ASSESSMENT AND COMMISSIONING TOOL WITH DYNAMIC REPORT GENERATION

(71) Applicant: Carrier Corporation, Palm Beach Gardens, FL (US)

(72) Inventors: Rohan Chabukswar, Cork (IE); Kushal Mukherjee, New Delhi (IN); Anarta Ghosh, Cork (IE)

(73) Assignee: CARRIER CORPORATION, Palm Beach Gardens, FL (US)

( * ) Notice: Subject to any disclaimer, the term of this patent is extended or adjusted under 35 U.S.C. 154(b) by 363 days.

(21) Appl. No.: 16/641,353

(22) PCT Filed: Aug. 24, 2018

(86) PCT No.: PCT/US2018/047855
§ 371 (c)(1),
(2) Date: Feb. 24, 2020

(87) PCT Pub. No.: WO2019/040815
PCT Pub. Date: Feb. 28, 2019

(65) Prior Publication Data
US 2020/0387151 A1  Dec. 10, 2020

Related U.S. Application Data

(60) Provisional application No. 62/549,826, filed on Aug. 24, 2017.

(51) Int. Cl.
*G05B 23/02*    (2006.01)
*G06Q 10/10*    (2012.01)
(Continued)

(52) U.S. Cl.
CPC .......... *G05B 23/0256* (2013.01); *F24F 11/38* (2018.01); *F24F 11/49* (2018.01);
(Continued)

(58) Field of Classification Search
CPC .. G05B 23/0256; G06Q 10/10; G06Q 50/163; G01F 15/06; F24F 11/38;
(Continued)

(56) References Cited

U.S. PATENT DOCUMENTS 5,446,677 A   8/1995   Jensen et al.
6,385,510 B1  5/2002   Hoog et al.
(Continued)

FOREIGN PATENT DOCUMENTS

WO   2015013677 A2   1/2015
WO   2016076946 A2   5/2016

OTHER PUBLICATIONS

Architectural Energy Corporation, "Advanced Automated HVAC Fault Detection and Diagnostics Commercialization PROGRAM"available at: https://ww2.energy.ca.gov/2013publications/CEC-500-2013-054/CEC-500-2013-054.pdf, Dec. 2008, 182 pages.
(Continued)

*Primary Examiner* — Santosh R Poudel
(74) *Attorney, Agent, or Firm* — Cantor Colburn LLP

(57) ABSTRACT

A building management system is provided. The building management system includes one or more variable air volume units and a controller. The controller includes a processor and a memory. The memory stores processor executable instruction. The processor executable instruction when executed by the processor cause the building management system to perform functional tests on the one or more variable air volume units of the building management system to generate building data; analyze the building data to produce health information per functional test; and visualize a condition of the building system based on the health information.

18 Claims, 4 Drawing Sheets

(51) Int. Cl.
*G06Q 50/16* (2012.01)
*F24F 11/38* (2018.01)
*F24F 11/49* (2018.01)
*F24F 11/50* (2018.01)
*F24F 11/63* (2018.01)
*F24F 11/74* (2018.01)
*G01F 15/06* (2022.01)

(52) U.S. Cl.
CPC .............. *F24F 11/50* (2018.01); *F24F 11/63* (2018.01); *F24F 11/74* (2018.01); *G06Q 10/10* (2013.01); *G06Q 50/163* (2013.01); *G01F 15/06* (2013.01)

(58) Field of Classification Search
CPC .. F24F 11/49; F24F 11/50; F24F 11/63; F24F 11/74
See application file for complete search history.

(56) References Cited

U.S. PATENT DOCUMENTS

| | | | |
|---|---|---|---|
| 7,783,977 B2 * | 8/2010 | Stadheim | F24F 11/30 715/227 |
| 8,099,194 B2 | 1/2012 | Chambers et al. | |
| 8,655,830 B2 | 2/2014 | Mackay | |
| 9,104,650 B2 | 8/2015 | Hosek et al. | |
| 9,482,442 B1 | 11/2016 | Mengle et al. | |
| 9,506,666 B2 | 11/2016 | Rite | |
| 9,581,985 B2 | 2/2017 | Walser et al. | |
| 2004/0186599 A1 * | 9/2004 | Ahmed | G05B 17/02 700/89 |
| 2004/0249597 A1 | 12/2004 | Whitehead | |
| 2006/0116067 A1 * | 6/2006 | Federspiel | F24F 11/0001 454/256 |
| 2011/0061015 A1 * | 3/2011 | Drees | H02J 13/00016 700/275 |
| 2011/0178977 A1 | 7/2011 | Drees | |
| 2012/0150788 A1 * | 6/2012 | Berg-Sonne | H02J 3/003 706/48 |
| 2012/0273581 A1 | 11/2012 | Kolk et al. | |
| 2013/0031011 A1 | 1/2013 | Lee et al. | |
| 2013/0035794 A1 | 2/2013 | Imani | |
| 2014/0249876 A1 | 9/2014 | Wu et al. | |
| 2014/0343886 A1 * | 11/2014 | Berinato | G05B 23/0256 702/123 |
| 2015/0261229 A1 | 9/2015 | Roy | |
| 2016/0292652 A1 | 10/2016 | Bowden, Jr. et al. | |
| 2016/0377309 A1 | 12/2016 | Abiprojo et al. | |
| 2017/0052536 A1 | 2/2017 | Warner et al. | |
| 2017/0153038 A1 * | 6/2017 | Wootton | F24F 11/49 |
| 2017/0314800 A1 * | 11/2017 | Bengea | G05B 13/04 |

OTHER PUBLICATIONS

Ewon, "Monitor your HVAC system from anywhere", available at: https://www.netbiter.com/applications/building-and-hvac/hvac, accessed Feb. 20, 20, 15 pages.
International Search Report and Written Opinion for application PCT/US2018/047855, dated Dec. 3, 2018, 23 pages.

* cited by examiner

BUILDING HEALTH ASSESSMENT AND COMMISSIONING TOOL WITH DYNAMIC REPORT GENERATION

BACKGROUND

The design, installation, assessment, and commissioning of contemporary energy systems in a building is often based solely on expert knowledge. Further, formal industry standard practices and services for enabling seamless installation and commissioning of these contemporary energy systems (e.g., plug 'n' play tools) do not currently exist. For instance, installers have to physically move back and forth between a control panel and individual zones of a contemporary energy system when performing a manual installation and verification process. The manual installation and verification process is inefficient use of resources, personnel, and time.

BRIEF DESCRIPTION

In accordance with one or more embodiments, a building management system is provided. The building management system comprises one or more variable air volume units; and a controller comprising a processor and a memory storing processor executable instruction, wherein the processor executable instruction when executed by the processor cause the building management system to: perform functional tests on the one or more variable air volume units of the building management system to generate building data; analyze the building data to produce health information per functional test; and visualize a condition of the building system based on the health information.

In accordance with one or more embodiments or the building management system embodiment above, the performance of the functional tests can comprise sending commands by the controller to each actuator of the one or more variable air volume units, and the commands can instruct each actuator to adjust a corresponding damper of the one or more variable air volume units to open or close in accordance with a flow value.

In accordance with one or more embodiments or any of the building management system embodiments above, the flow value is 40% or 60%.

In accordance with one or more embodiments or any of the building management system embodiments above, the controller can receive sensor signals from the one or more variable air volume units indicating flowrates for air before and after the corresponding dampers.

In accordance with one or more embodiments or any of the building management system embodiments above, the health information can indicate which of the one or more variable air volume units are working properly and which of the one or more variable air volume units are not working properly.

In accordance with one or more embodiments or any of the building management system embodiments above, the controller can execute an analytics algorithm of the processor executable instruction on the building data to determine the health information per functional test.

In accordance with one or more embodiments or any of the building management system embodiments above, the analyzation of the building data can comprise executing fault mode parameterization with respect to equipment type data associated with the one or more variable air volume units, executing equipment physics with respect to commissioning type data, and building data physics based models utilizing results from the fault mode parameterization and the equipment physics.

In accordance with one or more embodiments or any of the building management system embodiments above, the visualization can comprise a graphic user interface incorporating actionable information.

In accordance with one or more embodiments or any of the building management system embodiments above, the visualization can comprise a dynamic reports incorporating actionable information.

In accordance with one or more embodiments, a building management method is provided. The building management method comprises performing, by a controller comprising a processor and a memory, functional tests on one or more variable air volume units of the building management system to generate building data; analyzing, by the controller, the building data to produce health information per functional test; and visualizing, by the controller, a condition of the building system based on the health information.

In accordance with one or more embodiments or the building management method embodiment above, the performance of the functional tests can comprise sending commands by the controller to each actuator of the one or more variable air volume units, and the commands can instruct each actuator to adjust a corresponding damper of the one or more variable air volume units to open or close in accordance with a flow value.

In accordance with one or more embodiments or any of the building management method embodiments above, the flow value is 40% or 60%.

In accordance with one or more embodiments or any of the building management method embodiments above, the controller can receive sensor signals from the one or more variable air volume units indicating flowrates for air before and after the corresponding dampers.

In accordance with one or more embodiments or any of the building management method embodiments above, the health information can indicate which of the one or more variable air volume units are working properly and which of the one or more variable air volume units are not working properly.

In accordance with one or more embodiments or any of the building management method embodiments above, the controller can execute an analytics algorithm of the processor executable instruction on the building data to determine the health information per functional test.

In accordance with one or more embodiments or any of the building management method embodiments above, the analyzation of the building data can comprise executing fault mode parameterization with respect to equipment type data associated with the one or more variable air volume units, executing equipment physics with respect to commissioning type data, and building data physics based models utilizing results from the fault mode parameterization and the equipment physics.

In accordance with one or more embodiments or any of the building management method embodiments above, the visualization can comprise a graphic user interface incorporating actionable information.

In accordance with one or more embodiments or any of the building management method embodiments above, the visualization can comprise a dynamic reports incorporating actionable information.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
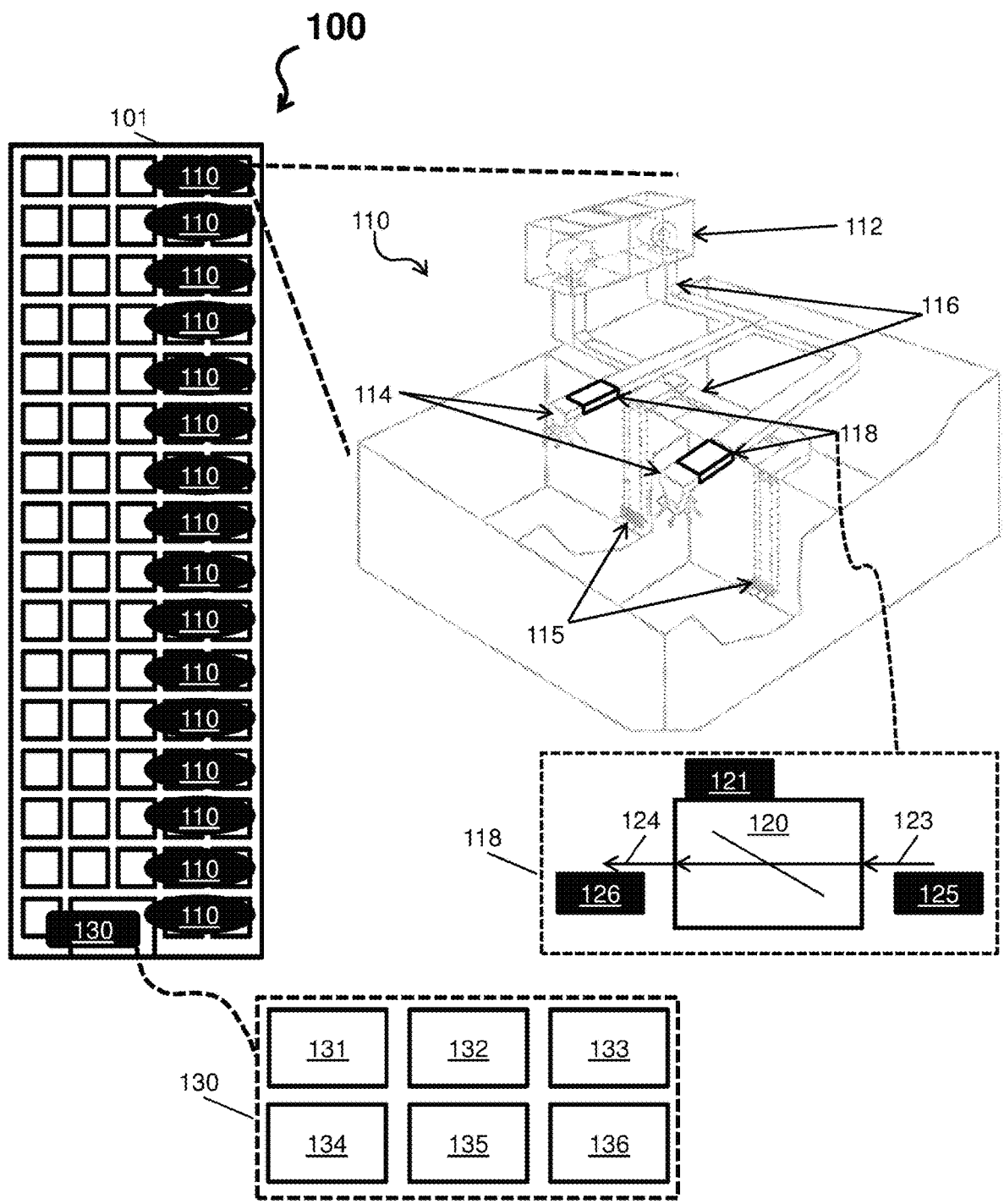
FIG. 1 depicts a building management system in accordance with one or more embodiments.

Embodiments disclosed herein may include a building management system, method, and/or computer program product (herein collectively referred to as the building management system) that provides a building health assessment and commissioning tool that collects and analyzes functional test data to generate dynamical building health reports. Turning now to FIG. 1, a building management system 100 is depicted in accordance with one or more embodiments.

The building management system 100 can comprise a facility 101 and one or more heating ventilation and air conditioning sub-systems 110. Each of the one or more heating ventilation and air conditioning sub-systems 110 comprise at least one air handling unit 112, one or more first air vents 114, one or more second air vents 115, ductwork 116, one or more variable air volume units 118.

The facility 101 can be any structure or any portion therein that includes the at least one air handling unit 112 and the one or more variable air volume units 118 connected via the ductwork 116. Examples of the facility 101 include buildings with multiple floors, high-rise buildings, sky scrapers, boats, cruise ships, parking garages, etc. Examples of a portion within a facility 101 includes a room, an office, a storage room, an entire floor, a conference room, a hallway, a bathroom, and the like or combination thereof.

The at least one air handling unit 112 can comprise a container (e.g., metal box) including a blower, heating and/or cooling elements, filter racks or chambers, sound attenuators, dampers, actuators, sensors, etc., each of which is utilized to heat or cool air. The at least one air handling unit 112 connects via the ductwork 116 to the one or more first air vents 114 and the one or more second air vents 115 to distribute the heated or conditioned air through the facility 101.

The air vents (e.g., the one or more first air vents 114 and the one or more second air vents 115) are openings that allow the heated or conditioned air to pass out of or into a confined space, such as a room or floor of the facility 110. The ductwork 116 a network of conduits or passages us to deliver and remove air. The variable air volume units 118 comprise at least one valve and actuator (along with a sensor) that varies airflow at a constant temperature for precise temperature control, reduced compressor wear, lower energy consumption, less fan noise, additional passive dehumidification, etc. For example, as shown in FIG. 1, a variable air volume unit 118 can comprise a damper 120 that is manipulated by an actuator 121 so that an inflow 123 of air can be decreased or increased to produce a desired outflow 124 of air. Thus, in operations, the variable air volume unit 118 can receive or take air from the at least one air handling unit 112 and supply that air to the facility or portion thereof. Further, sensors 125 and 126, which are further described herein, of the variable air volume unit 118 can detect flowrates for the air before and after the damper 120, respectively.

The building management system 100 can comprise a controller 130. The controller can comprise a processor 131, a memory 132, a communication interface 133, a transceiver 134, a display 135, and a sensor 136. The controller 130 can be any computing device comprising hardware and/or software for carrying out operations of the building management system 100.

As shown, the controller 130 can comprise a processor 131 and a memory 132. The processor 131 (also referred to as a processing circuit) can be coupled via a system bus to the memory 132, respectively, and various other components. The memory 132 can include a read only memory (ROM) and a random access memory (RAM). The ROM is coupled to the system bus and may include a basic input/output system (BIOS), which controls certain basic functions of the processor 131 or the building management system 100. The RAM is read-write memory coupled to the system bus for use by the processor 131.

Software for execution by the building management system 100 may be stored in the memory 132 (e.g., the memory 132 can store as a computer program products the building health assessment and commissioning tool for collecting and analyzing functional test data to generate dynamical building health reports). Note that the building health assessment and commissioning tool is designed with scalability and versatility so as to capable of being an added onto the contemporary energy systems (including being deployed remotely). The memory 132 is an example of a tangible storage medium readable by the processor 131, where the software is stored as instructions for execution by the processor 131 to cause the building management system 100 to operate, such as is described herein with reference to FIGS. 2-3. Examples of computer program product and the execution of such instruction is discussed herein in more detail.

The communication interface 133 and the transceiver 134 are hardware and or software of the controller 130 that interconnects the controller 130 with components within the building management system 100 and/or outside network, enabling the building management system 100 to communicate with external systems. The display 135 (e.g., screen, a display monitor) is connected to or integrated with the controller 130 and may include a display adapter and/or a graphics controller to support graphics intensive applications.

The sensor 136 (along with the sensors of the at least one air handling unit 112 and sensors 125 and 126 the one or more variable air volume units 118) can be electro-mechanical components that detect events or changes in an environment of the building management system 100 (or corresponding components therein). The sensors 136 output the events or changes as sensor signals to other components of the building management system 100 (e.g., the controller 130).

Figure 2:
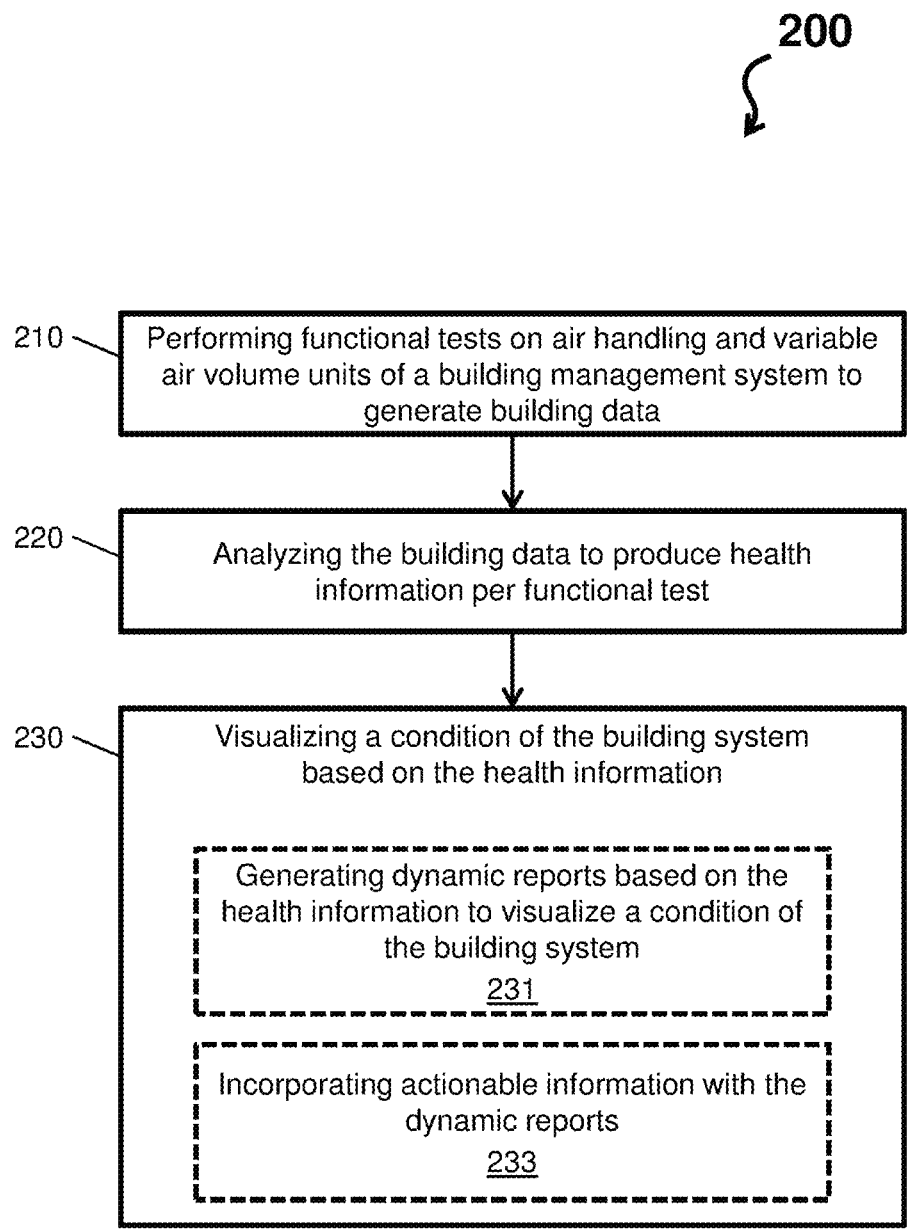
FIG. 2 depicts a process flow of a building management system in accordance with one or more embodiments.

Turning now to FIG. 2, operations of the building management system 100 is described in accordance with one or more embodiments. FIG. 2 depicts a process flow 200 where the controller 130 performs functional tests on air handling and variable air volume units (e.g., the at least one air handling unit 112 and the one or more variable air volume units 118) of the building management system 100 to generate building data. Note that the building data can be accumulated over a number of functional tests (over time) to produce historical building data.

For example, to perform a functional test, the controller 130 can send commands to each actuator 121 of the dampers 120 of the one or more variable air volume units 118. The commands can instruct the actuators 121 to adjust the corresponding dampers 120 to open or close in accordance with a flow value. The flow value can range from 0%, which is fully closed, to 100%, which is fully open based on the position of the damper 120. Note that an optimal flow value can be utilized by the building management system 100 to perform the functional tests, such as 40% or 60% (as choosing to high or low of a flow value can stress or damage the building management system 100). Further, in the functional tests, a position of the damper 120 can range from 0 to 100 in steps of a set value (e.g., 20), where the steps can be in sequential order (e.g., 0%, 20%, 40%, 60%, 80%, and 100%,) or random order (e.g., 80%, 20%, 100%, 0%, 60%, and 40%). In turn, the sensor 125 and 126 can send sensor signals back to the controller 130 indicating flowrates for the air before and after each damper of the one or more variable air volume units 118. In this way, the building data comprises the flow values (i.e., the damper positions) and the flowrates (e.g., both expected and detected flow rates). The building data can be stored on the memory 132, once received by the controller 130.

At block 220, the controller 130 analyzes the building data to produce health information per functional test. The health information indicates which of the one or more variable air volume units 118 are working properly and which of the one or more variable air volume units 118 are not working properly. An analytics algorithm can be executed on the building data to determine the health information per functional test. The analyzation of the building data and analytics algorithms are discussed further herein with respect to FIG. 3.

At block 230, the controller 130 visualizes a condition of the building system based on the health information. The visualization can include one or more forms, such as being displayed within a graphic user interface and/or a report. For example, as shown by dashed-block 231, the controller 130 can generate dynamic reports based on the health information to visualize a condition of the building system. Further, as shown by dashed-block 233, the controller 130 can incorporate actionable information with the dynamic reports.

In accordance with one or more embodiments, the dynamic report can display an aggregation of health information and pare that aggregation of health information to all root failure causes. The dynamic report can also display health of components within logical groups (e.g., for the case of a variable air volume units based systems, two variable air volume units that are connected to the same air handling unit belong to the same group; alternatively, variable air volume units can be grouped based on size, zones, floor/wing etc.) and individual performance characteristics each component (e.g., the variable air volume units). The dynamic report can display plots, which may be color coded, that detail a root cause.

Figure 3:
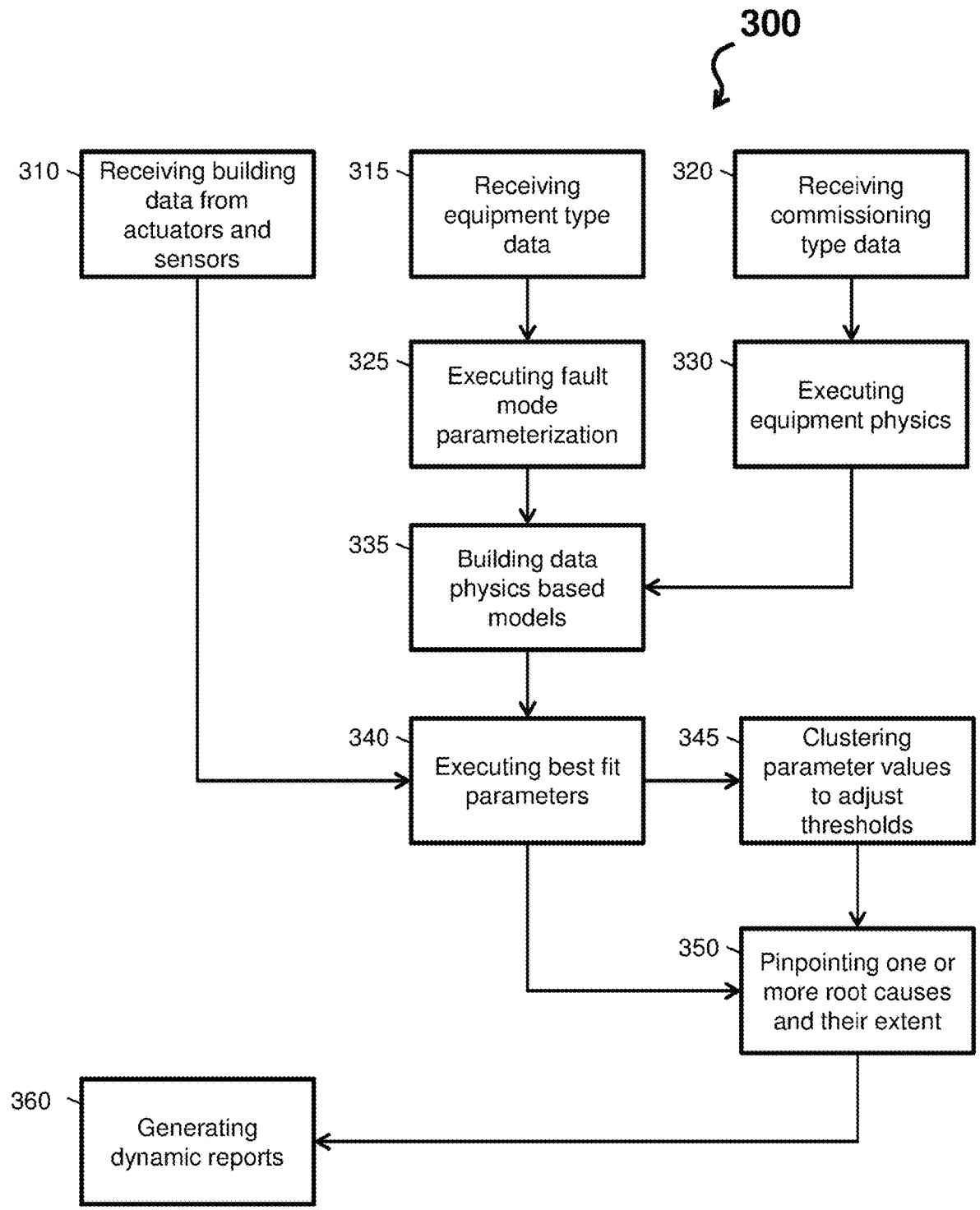
FIG. 3 depicts a process flow of a building management system in accordance with one or more embodiments.

In accordance with one or more embodiments, FIG. 3 depicts a process flow 300 of a building management system. The process flow 300 further defines the analyzation of the building data as seen in block 220 of FIG. 2. The process flow 300 begins at block 310 where the controller 130 receives building data from actuators and sensors.

At block 315, the controller 130 receives equipment type data. Further, at block 320, the controller 130 receives commissioning type data. At block 325, the controller 130 executes fault mode parameterization with respect to the equipment type data (associated with the one or more variable air volume units). At block 330, the controller 130 executes equipment physics with respect to the commissioning type data.

At block 335, utilizing the results of blocks 325 and 330, the controller 130 builds data physics based models. At block 340, the controller executes best fit parameters in view of the models and the received building data. Executing the best fit parameters can include the use of Equation 1, where A corresponds to maximum air flow (A≥0), α corresponds to resistance (α>0), β corresponds to leakage (0≤β≤1); and ϕ corresponds to angular offset (−π2<ϕ≤π2).

$$Q = A * \sqrt{\frac{1 + \frac{1}{\alpha}}{1 + \frac{1}{\alpha(\beta + (1-\beta) * (1 - |\cos(\max(\frac{x}{100} * \frac{\pi}{2} + \phi, 0))|))^2}}} \quad \text{Equation 1}$$

At block 345, the controller clusters parameter values to adjust thresholds. At block 340, the controller pinpoints one or more root causes and their extent with respect to the adjusted thresholds and the fitted parameters. At block 230, the controller 130 generates dynamic reports based on the one or more root causes and their extent.

Figure 4:
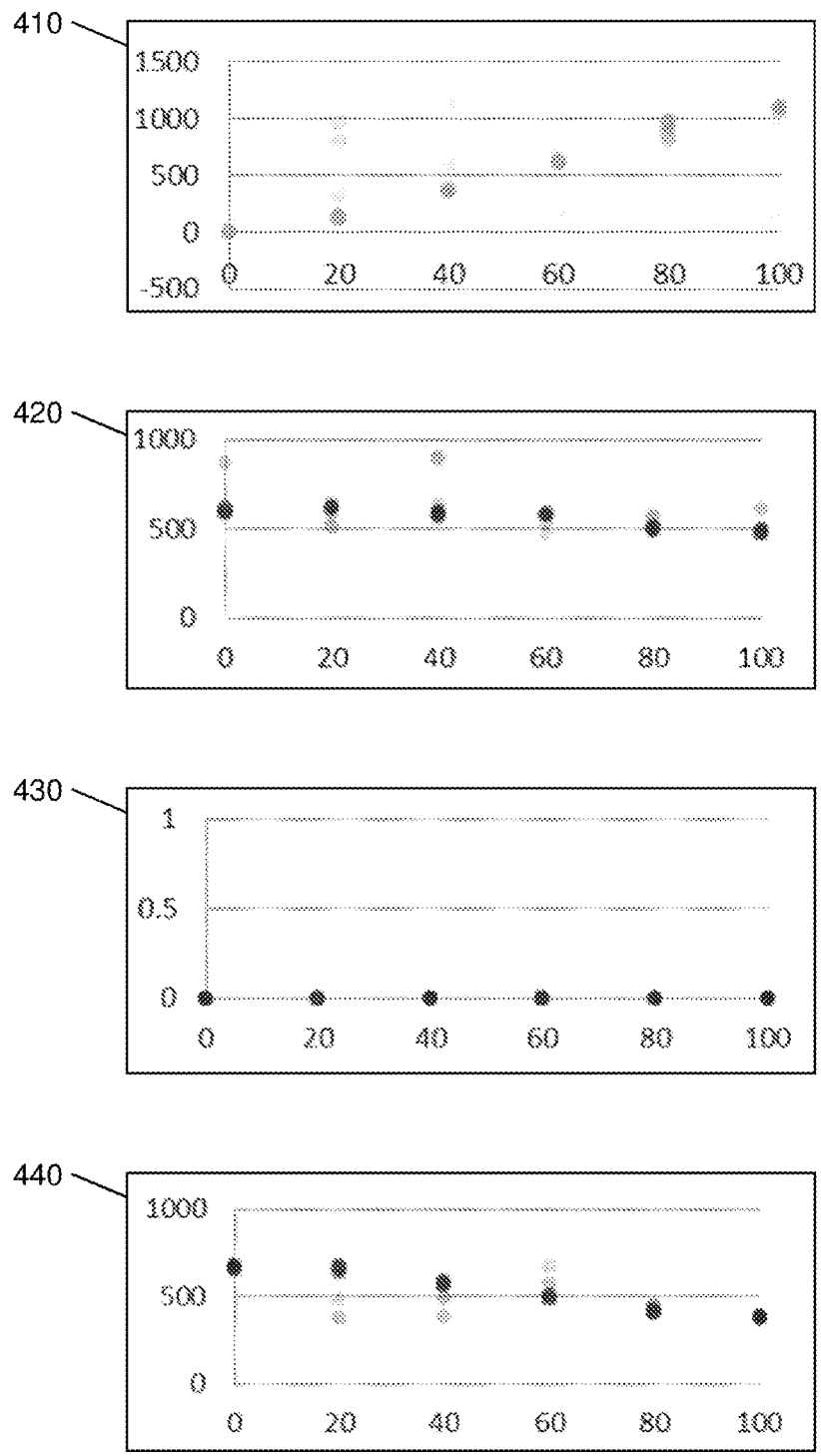
FIG. 4 depicts example variable air volume units damping scenarios in accordance with one or more embodiments.

Turning now to FIG. 4, example variable air volume units damping scenarios 410, 420, 420, and 440 are depicted in accordance with one or more embodiments. The variable air volume units damping scenario 410 illustrates a healthy variable air volume unit. The variable air volume units damping scenario 420 illustrates a stuck variable air volume unit. The variable air volume units damping scenario 430 illustrates a variable air volume unit with a sensor issue. The variable air volume units damping scenario 440 illustrates a variable air volume unit with a reversed wire issue.

Technical effects and benefits of embodiments of the building health assessment and commissioning tool herein can include a reduction in commissioning time (e.g., up to 50%); increased customer satisfaction, as installer expenses and technician callbacks are reduced; and energy savings and improved comfort due to the capability of identifying health information for any facility or building management system.

Embodiments herein can include a system, a method, and/or a computer program product at any possible technical detail level of integration. The computer program product may include a computer readable storage medium (or media) having computer readable program instructions thereon for causing a processor to carry out aspects of the embodiments herein.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the embodiments herein may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, to perform aspects of the embodiments herein.

Aspects of the embodiments herein are described herein with reference to flowchart illustrations and/or block diagrams of methods, apparatus (systems), and computer program products according to embodiments herein. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Aspects of the embodiments are described herein with reference to flowchart illustrations, schematics, and/or block diagrams of methods, apparatus, and/or systems according to embodiments. Further, the descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A building management system comprising:
a controller comprising a processor and a memory storing processor executable instruction, wherein the processor executable instruction when executed by the processor cause the building management system to:
perform functional tests on the one or more variable air volume units of a building system to generate building data;
analyze the building data to produce health information per functional test; and
generate an electronic representation of a condition of the building system based on the health information;
wherein the analyzation comprises:
generating, based at least in part on fault mode parameters of the building system, a model of the building system;
determining best-fit parameters based at least in part on the building data and the building model;
clustering the best-fit parameters to adjust a set of thresholds; and
using the best-fit parameters and the adjusted set of thresholds to identify one or more root causes and their extent with respect to the adjusted set of thresholds and the best-fit parameters.

2. The building management system of claim 1, wherein:
the functional tests comprise sending commands to each actuator of the one or more variable air volume units, and
the commands instruct each actuator to adjust a corresponding damper of the one or more variable air volume units to open or close in accordance with a flow value.

3. The building management system of claim 2, wherein the flow value is 40% or 60%.

4. The building management system of claim 2, wherein the controller receives sensor signals from the one or more variable air volume units indicating flowrates for air before and after the corresponding dampers.

5. The building management system of claim 1, wherein the health information indicates which of the one or more variable air volume units are working properly and which of the one or more variable air volume units are not working properly.

6. The building management system of claim 1, wherein the controller executes an analytics algorithm of the processor executable instruction on the building data to determine the health information per functional test.

7. The building management system of claim 1, wherein the analyzation of the building data further comprises executing fault mode parameterization with respect to equipment type data associated with the one or more variable air volume units, executing equipment physics with respect to commissioning type data, and building data physics based models utilizing results from the fault mode parameterization and the equipment physics, the model of the building system comprising the building data physics based model.

8. The building management system of claim 1, wherein the electronic representation comprises a graphic user interface incorporating actionable information.

9. The building management system of claim 1, wherein the electronic representation comprises a dynamic report incorporating actionable information.

10. A building management method comprising:
performing, by a controller comprising a processor and a memory, functional tests on one or more variable air volume units of a building system to generate building data;
analyzing, by the controller, the building data to produce health information per functional test; and
generating, by the controller, an electronic representation of a condition of the building management system based on the health information;
wherein the analyzation comprises:
generating, based at least in part on fault mode parameters of the building system, a model of the building system;
determining best-fit parameters based at least in part on the building data and the building model;
clustering the best-fit parameters to adjust a set of thresholds; and
using the best-fit parameters and the adjusted set of thresholds to identify one or more root causes and their extent with respect to the adjusted set of thresholds and the best-fit parameters.

11. The building management method of claim 10, wherein:
the functional tests comprise sending commands by the controller to each actuator of the one or more variable air volume units, and
the commands instruct each actuator to adjust a corresponding damper of the one or more variable air volume units to open or close in accordance with a flow value.

12. The building management method of claim 11, wherein the flow value is 40% or 60%.

13. The building management method of claim 11, wherein the controller receives sensor signals from the one or more variable air volume units indicating flowrates for air before and after the corresponding dampers.

14. The building management method of claim 10, wherein the health information indicates which of the one or more variable air volume units are working properly and which of the one or more variable air volume units are not working properly.

15. The building management method of claim 10, wherein the controller executes an analytics algorithm of the processor executable instruction on the building data to determine the health information per functional test.

16. The building management method of claim 10, wherein the analyzation of the building data further comprises executing fault mode parameterization with respect to equipment type data associated with the one or more variable air volume units, executing equipment physics with respect to commissioning type data, and building data physics based models utilizing results from the fault mode parameterization and the equipment physics, the model of the building system comprising the building data physics based model.

17. The building management method of claim 10, wherein the electronic representation comprises a graphic user interface incorporating actionable information.

18. The building management method of claim 10, wherein the electronic representation comprises a dynamic report incorporating actionable information.

* * * * *